US008905101B2

(12) United States Patent
Horiuchi

(10) Patent No.: US 8,905,101 B2
(45) Date of Patent: Dec. 9, 2014

(54) RUN FLAT TIRE

(75) Inventor: Kenji Horiuchi, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 437 days.

(21) Appl. No.: 13/298,201

(22) Filed: Nov. 16, 2011

(65) Prior Publication Data

US 2012/0132338 A1 May 31, 2012

(30) Foreign Application Priority Data

Nov. 29, 2010 (JP) ................................. 2010-264858

(51) Int. Cl.
*B60C 17/00* (2006.01)
*B60C 17/06* (2006.01)
*B60C 15/00* (2006.01)

(52) U.S. Cl.
USPC ........... 152/516; 152/539; 152/546; 152/552; 152/554

(58) Field of Classification Search
None
See application file for complete search history.

(56) References Cited

FOREIGN PATENT DOCUMENTS

| GB | 2138367 | * 10/1984 |
| JP | 07-304312 | 11/1995 |
| JP | 2009-061866 | 3/2009 |

* cited by examiner

*Primary Examiner* — Justin Fischer
(74) *Attorney, Agent, or Firm* — Thorpe North & Western LLP

(57) ABSTRACT

A run flat tire where: the ratio of the cross-sectional height on the inner side in the radial direction to the cross-sectional height on the outer side in the radial direction, having the maximum tire width in a state inflated to an air pressure as a boundary; the inclination angle of the outer wall in the upper region of the side wall portion; the curving form of the tread surface; the position of the carcass folded over end; the height of the bead filler; the relationship between the thickness of the outer side rubber taken on a line normal to the rim line and the maximum thickness of the outer side rubber in an upper region of the bead portion; and the relationship of the thickness of the inner side rubber and the thickness of the outer side rubber taken on a line normal to the rim line are stipulated.

11 Claims, 3 Drawing Sheets

RUN FLAT TIRE

PRIORITY CLAIM

Priority is claimed to Japan Patent Application Serial No. 2010-264858 filed on Nov. 29, 2010.

BACKGROUND

1. Technical Field

The present technology relates to a run flat tire, and particularly relates to a run flat tire configured so as to have both durability when run-flat traveling and riding comfort when regular traveling.

2. Related Art

Generally, in run flat tires provided with a side reinforcing layer having a falcated cross-section on an inner surface side of a side wall portion, methods such as increasing a thickness of the side reinforcing layer and using a rubber with a high hardness have been used in order to ensure durability when run-flat traveling. However, when only these sorts of technologies are applied, there are problems in that the degree to which excellent run flat durability can be ensured is limited and riding comfort when regular traveling is significantly worsened due to an increase in side stiffness.

Particularly, when the tire cross-sectional height reaches a certain height, failures when run-flat traveling consist mainly of breakdowns in the vicinity of the rim cushion near the bead portion. Therefore, there is a strong demand for technology that prevents such failures and, simultaneously, ensures excellent riding comfort.

Conventionally, technology has been proposed to solve this problem wherein a cushioning rubber layer is disposed in the vicinity of a rim line on an outer side in a tire axial direction of a folded up portion of a carcass layer. When the side wall portion buckles, the cushioning rubber layer exerts a cushioning action, with respect to the upthrust by a rim flange, between the carcass folded up edge portion and the rim flange in order to prevent rupturing in that area (e.g. see Japanese Unexamined Patent Application Publication No. H07-304312A). Additionally, technology has been proposed wherein a folded up end of a carcass layer is distanced from a region where it contacts a rim flange top edge portion in order to suppress the generation and/or expansion of cracking due to the concentration of stress in the vicinity of the folded up end of the carcass layer (e.g. see Japanese Unexamined Patent Application Publication No. 2009-61866A).

However, when inflated air pressure declines, both of these proposals experience difficulty in suppressing the buckling of the tread portion and are limited as to effectiveness in enhancing run flat durability and, at the same time, do not directly lead to improvement effects in riding comfort when regular traveling. Therefore, neither proposal provides technology that can sufficiently satisfy the demands for both run flat durability and riding comfort.

SUMMARY

The present technology provides a run flat tire configured so as to achieve high levels of durability when run-flat traveling, and riding comfort when regular traveling. A run flat tire in accordance with an example includes at least one layer of a carcass layer provided around bead cores embedded in a left-right pair of bead portions and folded over from a tire inner side toward a tire outer sides. A plurality of belt layers is disposed in an outer circumferential side in a tread portion, a belt cover layer formed from organic fiber cords is disposed on the outer circumferential side of the belt layers, and a side reinforcing layer having a falcated cross-section is disposed between the carcass layer and an inner liner layer in a side wall portion. In the run flat tire described above, a relationship between a tire cross-sectional height SHi on an inner side in the tire radial direction and a tire cross-sectional height SHo on an outer side in the tire radial direction, demarcated by a maximum tire width position when the run flat tire is assembled on a JATMA (Japan Automobile Tyre Manufacturers Association) regulation standard rim and inflated to an air pressure of 180 kPa, is $0.7<SHi/SHo<0.9$. Furthermore, an intersection P of a line tangent to an intersection S of a straight line Q in a tire axial direction passing through a midpoint of the tire cross-sectional height SHo and a tire outer wall and an tire external diameter line Z is positioned more to a tire equatorial plane side than a region R that corresponds to 90% of a rim width HRW of the standard rim having the tire equatorial plane as a center. Moreover, an angle $\alpha$ of a straight line connecting, in the tread surface, a point O on the tire equatorial plane and a point R' on a shoulder side corresponding to 110% of a tire ground contact width TW having the tire equatorial plane as a center, with respect to the tire axial direction, is from 7.5° to 10°. A folded up end of the carcass layer is positioned in a region within 15 mm from an outer peripheral surface of the bead core toward the outer side in the tire radial direction and a height Hf of an outer peripheral edge of the bead filler is from 40% to 70% of a tire cross-section height SH. When Ga is a rubber thickness, taken on a line normal to the rim line at an outer wall surface of the bead portion, between the carcass layer and an outer wall surface of the side wall portion; and Gb is a maximum rubber thickness taken on a line normal to the carcass layer between the carcass layer and the outer wall surface of the side wall portion, a relationship between Ga and Gb is $0.60\ Gb<Ga<0.85\ Gb$. When Gc is a rubber thickness taken on a line normal to the rim line between the carcass layer and a tire inner wall surface, a relationship between Gc and Ga is $0.75Ga<Gc<1.00Ga$.

Furthermore, the configuration described above is preferably configured as described in (1) to (4) below.

(1) A relationship between the tire ground contact width TW and a tire maximum width SW is $0.65<TW/SW<0.75$.

(2) The side reinforcing layer is formed from an inner side rubber and an outer side rubber that are continuous in the tire radial direction. The inner side rubber of the rubber forming the side reinforcing layer has a higher JIS-A (Japanese Industrial Standard A) hardness than that of the outer side rubber. In this case, a tan δ at 60° C. of the inner side rubber is preferably greater than a tan δ at 60° C. of the outer side rubber. Furthermore, a demarcation face between the inner side rubber and the outer side rubber is preferably positioned in the tire outer side so as to be more to the outer side in the tire radial direction than in the tire inner side.

(3) The bead filler is formed of an inner side rubber and an outer side rubber that are continuous in the tire radial direction and have a tan δ at 60° C. of not more than 0.1. A height h of the tire inner side of the demarcation face between the inner side rubber and the outer side rubber is from 10% to 40% of the tire cross-section height SH. A position of the tire outer side of the demarcation face is inward in the tire radial direction from the rim line. In this case, in the bead filler, a JIS-A hardness of the inner side rubber is preferably greater than that of the outer side rubber. Furthermore, the tan δ at 60° C. of the inner side rubber is preferably greater than the tan δ at 60° C. of the outer side rubber.

(4) The belt cover layer is composed of a composite fiber cord that is formed by twisting together a low elasticity yarn and a high elasticity yarn having differing elastic moduli.

According to the present technology, a ratio SHi/SHo between a tire cross-sectional height SHi on an inner side in the tire radial direction and a tire cross-sectional height SHo on an outer side in the tire radial direction, demarcated by a maximum tire width position when the run flat tire is inflated to a certain air pressure, is from 0.7 to 0.9; and the maximum tire width position is located on the bead portion side. Moreover, an intersection P of a line tangent to an intersection S of a straight line Q in a tire axial direction passing through a midpoint of the tire cross-sectional height SHo and a tire outer wall and an tire external diameter line Z is positioned more to a tire equatorial plane side than a region R that corresponds to 90% of a rim width HRW of the standard rim having the tire equatorial plane as a center. Thereby, an angle formed by the tire outer wall in an upper region of the side wall portion is set so as to be gradual in the tire axial direction. Additionally, an angle α of a straight line connecting, in the tread surface, a point O on the tire equatorial plane and a point R' on a shoulder side corresponding to 110% of a tire ground contact width TW having the tire equatorial plane as a center, with respect to the tire axial direction, is set to a large angle (from 7.5° to 10°). Therefore, a cross-sectional shape of the tread surface is formed into a curved surface. As a result of the synergy achieved therefrom, even if the inflated air pressure declines, buckling of the tread portion can be prevented and excellent durability can be ensured while enhancing riding comfort when regular traveling to a high level.

Moreover, a folded up end of the carcass layer is positioned in a lower region within 15 mm from an outer peripheral surface of the bead core toward the outer side in the tire radial direction and a height Hf of an outer peripheral edge of the bead filler is configured to be from 40% to 70% of a tire cross-section height SH. Therefore, rubber thickness between the rim flange and the carcass layer, in the vicinity of the area that is subjected to the greatest contact pressure with the rim, can be ensured without severely increasing the rubber thickness of the side wall portion. As a result, breakdowns of the carcass layer in the vicinity of the rim cushion when run-flat traveling can be effectively suppressed and, at the same time, due to the folded up end of the carcass layer being distanced from the portion where the greatest deflection occurs, failures caused by cracks from the folded up end of the carcass layer can be effectively suppressed.

Additionally, the relationship between the rubber thickness Ga, taken on the line normal to the rim line between the carcass layer and the outer wall surface of the side wall portion, and the maximum rubber thickness Gb, taken on the line normal to the carcass layer between the carcass layer and the outer wall surface of the side wall portion, is such that each thickness is set within a predetermined range; and a ratio of variation in the rubber thickness in the tire radial direction on the outer side of the carcass layer is restricted. As a result, localized, concentrated stress caused by contact pressure with the rim is relieved, which leads to separation breakdowns of the rubber in the vicinity of the rim cushion being suppressed when run-flat traveling. At the same time, rubber thickness in the upper region of the bead portion being ensured and, therefore, riding comfort when regular traveling can be enhanced.

Furthermore, a large rubber thickness Gc taken on the line normal to the rim line between the carcass layer and the tire inner wall surface is ensured, and the rubber thickness Gc is set so as to be close to the rubber thickness Ga described above. As a result, it is possible to relieve shearing stress acting between main body side and the folded over side of the carcass layer, which leads to separation breakdowns therebetween being suppressed. Particularly, durability when run-flat traveling can be enhanced, and, at the same time, riding comfort when regular traveling can be enhanced due to rubber thickness being maintained in regions where great deformation occurs due to input from the rim.

DETAILED DESCRIPTION

Detailed descriptions will be given below of a configuration of the present technology with reference to the accompanying drawings.

Figure 1:
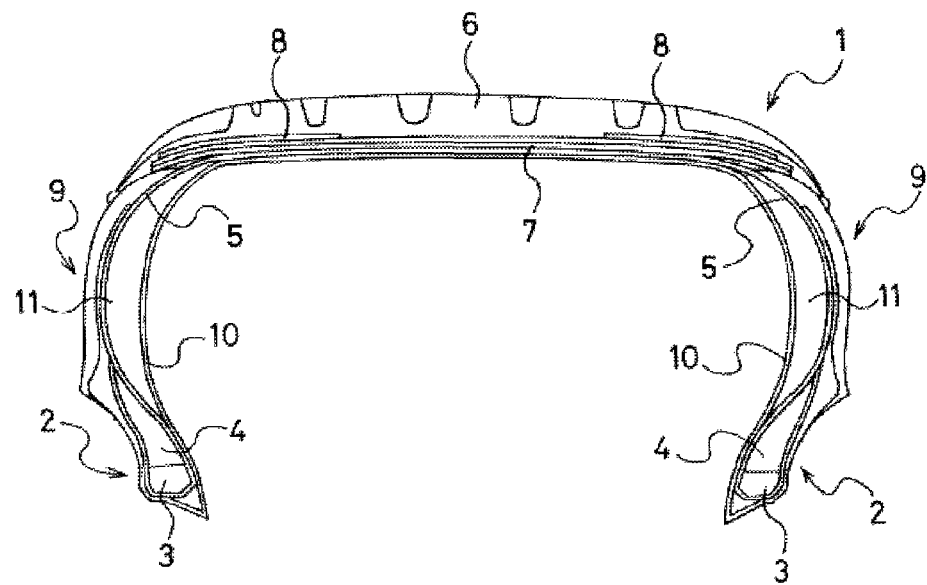
FIG. 1 is a cross-sectional view illustrating a construction of a run flat tire having a form in which a side reinforcing layer is disposed on an inner surface side of a side wall portion.

FIG. 1 is a cross-sectional view illustrating a construction of a run flat tire having a form in which a side reinforcing layer is disposed on an inner surface side of a side wall portion.

In FIG. 1, a run flat tire 1 includes one layer of a carcass layer 5 provided around bead cores 3,3 embedded in a left-right pair of bead portions 2,2 and folded over from a tire inner side toward a tire outer side, wherein a plurality of belt layers 7 are disposed in an outer circumferential side in a tread portion 6, a belt cover layer 8 is disposed on the outer circumferential side of the belt layers 7, and a side reinforcing layer 11 having a falcated cross-section is disposed between the carcass layer 5 and an inner liner layer 10 of side wall portions 9,9.

Figure 2:
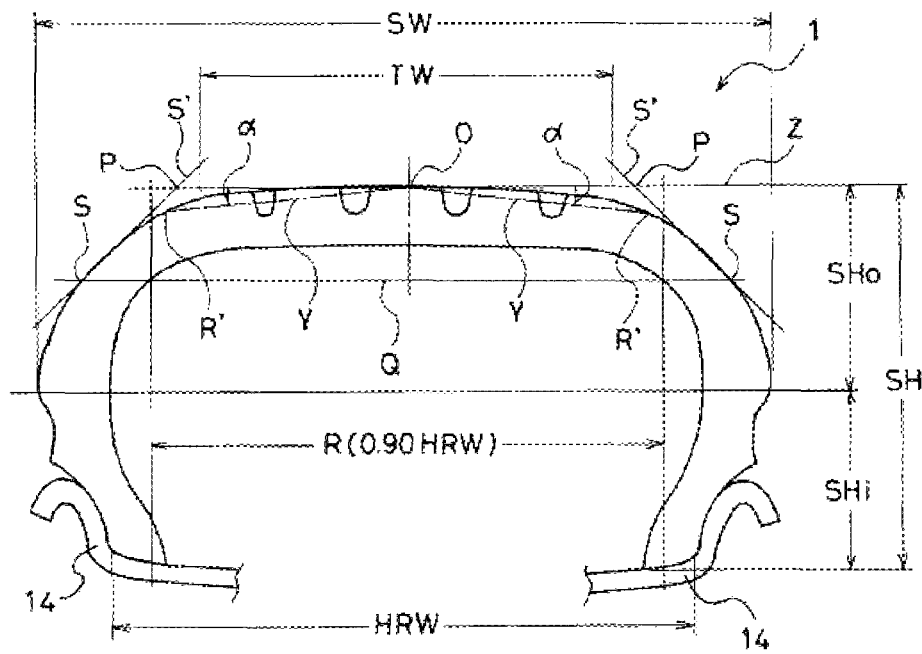
FIG. 2 is a cross-sectional view illustrating an outer wall shape of the run flat tire according to an embodiment of the present technology.

As illustrated in FIG. 2, in the present technology, a relationship between a tire cross-sectional height SHi on an inner side in the tire radial direction and a tire cross-sectional height SHo on an outer side in the tire radial direction, demarcated by a maximum tire width position when the run flat tire 1 is assembled on a JATMA regulation standard rim 14 and inflated to an air pressure of 180 kPa, is configured so as to be 0.7<SHi/SHo<0.9.

Furthermore, an intersection P of a line S' tangent to an intersection S of a straight line Q in a tire axial direction passing through a midpoint of the tire cross-sectional height SHo and a tire outer wall and an tire external diameter line Z is positioned more to a tire equatorial plane side than a region R that corresponds to 90% of a rim width HRW of the standard rim 14 having the tire equatorial plane as a center. Furthermore, an angle α of a straight line Y connecting, in the tread surface, a point O on the tire equatorial plane and a point R' on a shoulder side corresponding to 110% of a tire ground contact width TW having the tire equatorial plane as a center, with respect to the tire axial direction, is configured to be from 7.5° to 10°, and preferably from 8.0° to 9.5°.

Thus, a ratio SHi/SHo between the tire cross-sectional height SHi on the inner side in the tire radial direction and the tire cross-sectional height SHo on the outer side in the tire radial direction, demarcated by the maximum tire width position is from 0.7 to 0.9; and the maximum tire width position is located on the bead portion 2 side. Moreover, the intersection P of a line tangent to the intersection S of the straight line Q in the tire axial direction passing through the midpoint of the tire cross-sectional height SHo and the tire outer wall and the tire external diameter line Z is positioned more to the tire equatorial plane side than the region R that corresponds to 90% of the rim width HRW of the standard rim having the tire equatorial plane as a center. Thereby, an angle formed by the tire outer wall in an upper region of the side wall portion is set so as to be gradual in the tire axial direction. Additionally, the angle α of the straight line connecting, in the tread surface, the point O on the tire equatorial plane and the point R' on the shoulder side corresponding to 110% of the tire ground contact width TW having the tire equatorial plane as a center, with respect to the tire axial direction, is set to a large angle (from 7.5° to 10°). Therefore, a cross-sectional shape of the tread surface is formed into a curved surface. As a result of the synergy achieved therefrom, even if the inflated air pressure declines, buckling of the tread portion can be prevented and excellent durability can be ensured while enhancing riding comfort when regular traveling to a high level.

In the present technology, "tire ground contact width TW" refers to a maximum linear distance in the tire width direction of a contact surface formed with a flat plate when, after the tire 1 is assembled on a standard rim 14, filled to an air pressure corresponding to a maximum load capacity defined by JATMA and placed perpendicularly on the flat plate in a motionless state, a load corresponding to 80% of the maximum load capacity is applied.

Figure 3:
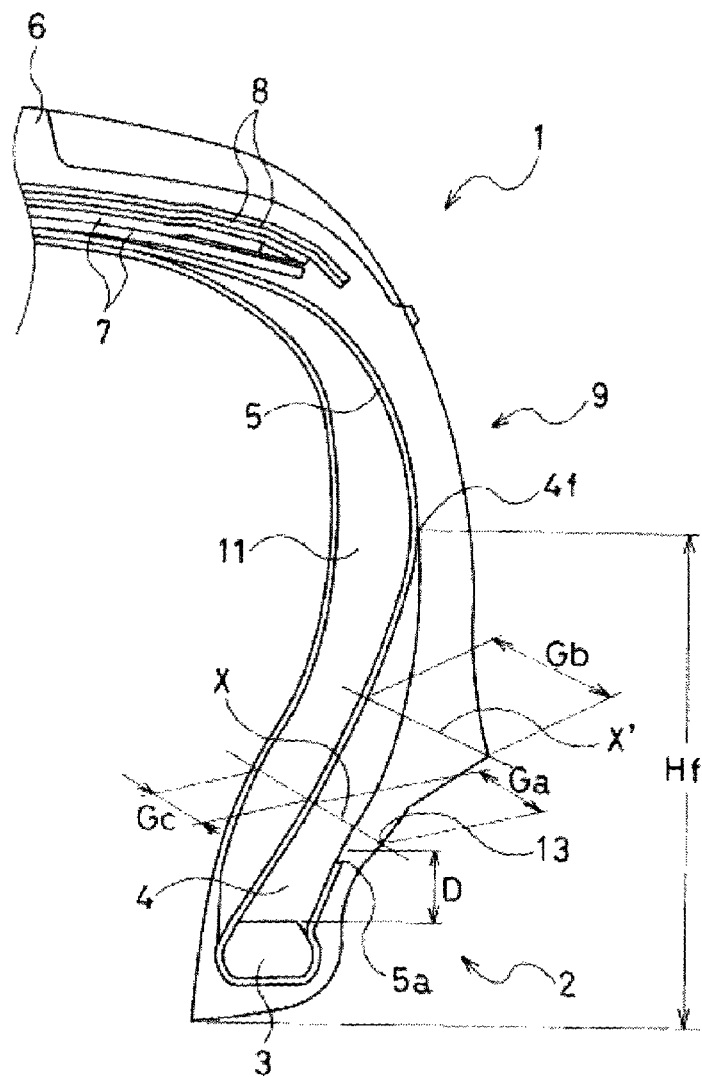
FIG. 3 is a cross-sectional view illustrating an enlarged example of an internal structure of the side wall portion of the run flat tire according to the embodiment of the present technology.

Furthermore, in the present technology, as illustrated in FIG. 3, a folded up end 5*a* of the carcass layer 5 is positioned in a range illustrated by a lower region D that is within 15 mm from an outer peripheral surface of the bead core 3 toward the outer side in the tire radial direction. Additionally, a height Hf of an outer peripheral edge 4*f* of the bead filler 4 is configured to be from 40% to 70% of a tire cross-section height SH.

Therefore, rubber thickness between the rim flange and the carcass layer 5, in the vicinity of the area that is subjected to the greatest contact pressure with the rim 14, can be ensured without severely increasing the rubber thickness of the side wall portion 9. As a result, breakdowns of the carcass layer 5 in the vicinity of the rim cushion when run-flat traveling can be effectively suppressed and, at the same time, due to the folded up end 5*a* of the carcass layer 5 being distanced from the portion where the greatest deflection occurs, failures caused by cracks from the folded up end 5*a* of the carcass layer 5 can be effectively suppressed.

Here, if the height Hf of the outer peripheral edge 4*f* of the bead filler 4 exceeds 70% of the tire cross-section height SH, it will be difficult to ensure riding comfort when regular traveling; and if less than 40%, the rubber thickness between the rim flange and the carcass layer 5 in the vicinity of the rim cushion will be insufficient, and it will be difficult to ensure run flat durability.

Furthermore, in the present technology, when Ga is a rubber thickness taken on the line X normal to a rim line 13 between the carcass layer 5 and an outer wall surface of the side wall portion 9 in the outer wall surface of the bead portion 2, and Gb is a maximum rubber thickness taken on a line normal to the carcass layer 5 between the carcass layer 5 and the outer wall surface of the side wall portion 9, a relationship between Ga and Gb is configured to be 0.60 Gb<Ga<0.85 Gb, and preferably 0.70 Gb<Ga<0.80 Gb. Note that in FIG. 3, the normal line at the position where the rubber thickness between the carcass layer 5 and the outer wall surface of the side wall portion 9 is at a maximum taken on the line normal to the carcass layer 5 is indicated as X'.

Thus, a ratio of variation in the rubber thickness in the tire radial direction on the outer side of the carcass layer 5 described above is restricted. As a result, localized, concentrated stress caused by contact pressure with the rim 14 is relieved, which leads to separation failures of the rubber in the vicinity of the rim cushion when run-flat traveling being suppressed, at the same time, riding comfort when regular traveling can be improved due to the rubber thickness in the upper region of the bead portion 2 being ensured.

Here, if the rubber thickness Ga taken on the line X normal to the rim line 13 is set to be 0.85 times or more of the maximum rubber thickness Gb taken along the line normal to the carcass layer 5, the form of the carcass line will not be maintainable and/or a gross volume of the rubber will become excessively large, leading to the durability being inhibited. Note that "rim line 13" described above refers to a thin line extending in a tire circumferential direction that is provided on the outer wall surface of the bead portion 2 so that the interlocked state of the tire and the rim can be externally determinable.

Furthermore, when Gc is a rubber thickness taken on the line X normal to the rim line 13 between the carcass layer 5 and a tire inner wall surface, a relationship between Gc and Ga is adjusted to be 0.75Ga<Gc<1.00Ga, and preferably 0.85Ga<Gc<0.95Ga.

The rubber thickness Gc is set so as to be close to the rubber thickness Ga as described above. As a result, it is possible to relieve shearing stress acting between the main body side and the folded over side of the carcass layer 5, which leads to separation failures therebetween being suppressed. Particularly, durability when run-flat traveling can be enhanced, and, at the same time, riding comfort when regular traveling can be enhanced due to rubber thickness being maintained in regions where great deformation occurs due to input from the rim 14.

Here, if the rubber thickness Gc on the tire inner wall surface side taken on the line X normal to the rim line 13 is set to be greater than or equal to the rubber thickness Ga on the tire outer wall surface, the form of the carcass line will not be maintainable and/or a gross volume of the rubber will become excessively large, leading to the durability being inhibited.

In the present technology, a relationship between the tire ground contact width TW and the tire maximum width SW (see FIG. 1) is preferably adjusted to be 0.65<TW/SW<0.75. Thereby, it is possible to have higher levels of both durability when run-flat traveling and riding comfort when regular traveling.

Figure 4:
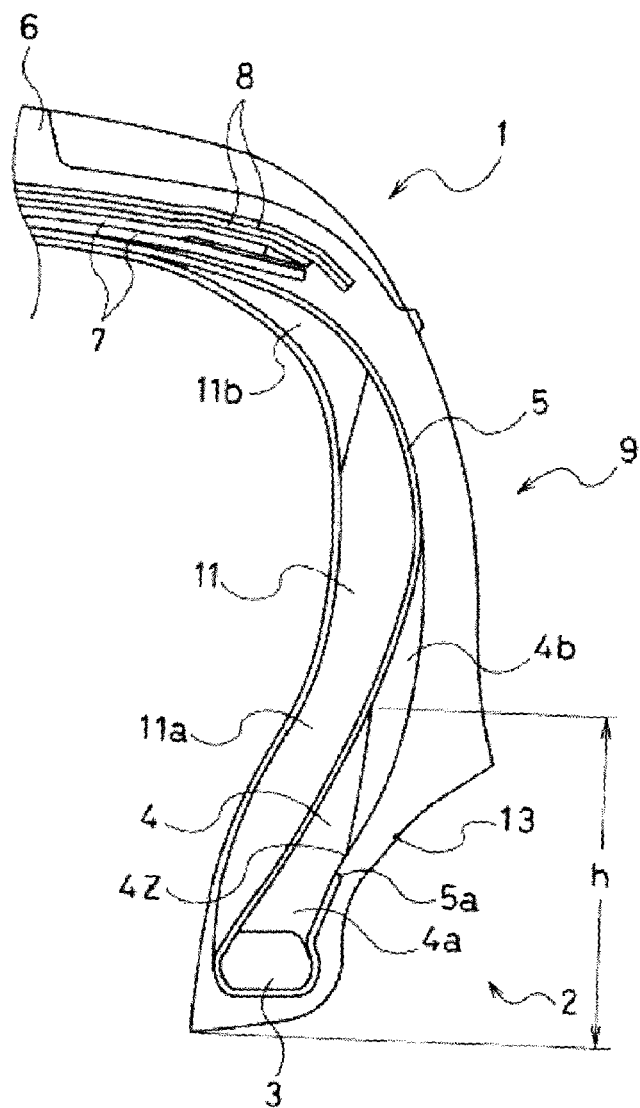
FIG. 4 is a cross-sectional view illustrating another enlarged example of an internal structure of the side wall portion of the run flat tire according to the embodiment of the present technology.

In the present technology, as illustrated in FIG. 4, the side reinforcing layer 11 described above is more preferably formed from an inner side rubber 11*a* and an outer side rubber 11*b* that are continuous in the tire radial direction, and the inner side rubber 11*a* of the rubber forming the side reinforcing layer preferably has a higher JIS-A hardness than that of the outer side rubber 11*b*. Thereby, a soft rubber is disposed on the tread portion 6 side, resulting in the rubber in the vicinity of the shoulder portion being deformable, which leads to a reduction in the stress received from the rim 14 and makes possible the further enhancement of riding comfort when regular traveling. Note that the JIS-A hardness of the rubber forming the side reinforcing layer 11 is commonly configured to be in a range from 60 to 80.

In this case, more preferably, a tan δ at 60° C. of the inner side rubber 11*a* is less than a tan δ at 60° C. of the outer side rubber 11*b*. Thereby, heat generation in the soft rubber on the tread portion 6 side can be suppressed and declines in durability can be effectively suppressed. Note that the tan δ at 60°

C. of the rubber forming the side reinforcing layer 11 is commonly configured to be in a range from 0.01 to 0.10.

In the case described above, a demarcation face between the inner side rubber 11a and the outer side rubber 11b is preferably formed as a face inclining from the outer side in the tire radial direction toward the inner side in the tire radial direction from the tire outer side toward the tire inner side; and this inclined face is preferably positioned in the tire outer side so as to be more to the outer side in the tire radial direction than in the tire inner side. Thereby, heat generation in the side reinforcing layer 11 when run-flat traveling can be effectively suppressed.

In the present technology, more preferably, the bead filler 4 is formed from rubber having a tan δ at 60° C. of not more than 0.1 and, as illustrated in FIG. 4, the bead filler 4 is formed from an inner side rubber 4a and an outer side rubber 4b that are continuous in the tire radial direction; and a demarcation face between the inner side rubber 4a and the outer side rubber 4b is formed as a face inclining from the outer side in the tire radial direction toward the inner side in the tire radial direction from the tire inner side toward the tire outer side. A height h of the tire inner side of the inclined face is preferably from 10% to 40% of the tire cross-section height SH; and a position 4z of the tire outer side of the inclined face is preferably inward in the tire radial direction from the rim line 13.

Due to using a reduced heat build-up rubber for the bead filler 4 as described above, heat build-up when run-flat traveling can be suppressed. At the same time, due to respectively specifying the height h of the tire inner side and the position 4z of the tire outer side of the demarcation face between the inner side rubber 4a and the outer side rubber 4b, separation failures at the demarcation face between the inner side rubber 4a and the outer side rubber 4b when run-flat traveling can be effectively suppressed.

In this case, in the bead filler 4, a JIS-A hardness of the inner side rubber 4a is preferably configured to be greater than that of the outer side rubber 4b. Thereby, the soft outer side rubber 4b will be a cushioning material, stress generated between the bead filler 4 and the carcass layer 5 can be effectively relieved, and breakdown failures of the carcass layer 5 in the vicinity of the rim cushion can be suppressed while enhancing riding comfort when regular traveling. Note that the JIS-A hardness of the rubber forming the bead filler 4 is commonly configured to be in a range from 70 to 95.

In the case described above, more preferably, a tan δ at 60° C. of the inner side rubber 4a is configured to be greater than a tan δ at 60° C. of the outer side rubber 4b. Thereby, heat generation in the bead filler 4 can be effectively suppressed and excellent durability can be ensured.

In the present technology, the belt cover layer 8 more preferably is composed of a composite fiber cord that is formed by twisting together a low elasticity yarn and a high elasticity yarn having different elastic moduli. By using the composite fiber cord, which is formed by twisting together a low elasticity yarn and a high elasticity yarn, as the belt cover layer 8, the drawbacks of low elasticity fiber cords (recoverablility of distortions being difficult to obtain due to high heat generation), and the drawbacks of high elasticity cords (slightly problematic compression fatigue and adhesiveness) can be mutually compensated for.

Moreover, by appropriately selecting the type and physical properties of the composite fiber cord, stiffness in the crown portion is ensured, which leads to excellent steering stability and riding comfort being displayed when regular traveling and also makes possible the enhancing of run flat durability by suppressing buckling of the tread portion 6 when run-flat traveling.

As described above, with the run flat tire of the present technology, the ratio of the tire cross-sectional height on the inner side in the radial direction to the tire cross-sectional height on the outer side in the radial direction, having the maximum tire width in a state inflated to a certain air pressure as a boundary; the inclination angle of the tire outer wall in the upper region of the side wall portion; and the curving form of the tread surface are each stipulated. Thereby, input from road surfaces can be efficiently relieved. Moreover, with the run flat tire of the present technology, the position of the folded over end of the carcass layer; the height of the bead filler; the relationship between the thickness of the outer side rubber taken on a line normal to the rim line and centered on the carcass layer and the maximum thickness of the outer side rubber in an upper region of the bead portion; and the relationship of the thickness of the inner side rubber and the thickness of the outer side rubber taken on a line normal to the rim line and centered on the carcass layer are each stipulated. Therefore, localized, concentrated stress caused by contact pressure with the rim is avoided, which leads to enhancements in both run flat durability and riding comfort when regular traveling. Therefore, the run flat tire of the present technology can be widely applied as a run flat tire for mounting on modern, high-performance vehicles.

EXAMPLES

A conventional tire (Conventional Example) and present technology tires (Working Examples 1 to 5) were manufactured having a common tire size of 245/45R17. A position of the intersection P with respect to the line of demarcation in the region that corresponds to 90% of the rim width ("Intersection P position" in Table 1) after inflation to an air pressure of 180 kPa, an angle α of a straight line Y with respect to the tire axial direction ("Angle α" in Table 1), a distance in the tire radial direction of the folded up end of the carcass layer from the bead core outer peripheral surface ("Carcass folded up end to bead core outer peripheral surface" in Table 1), a height (Hf/SH) of the outer peripheral edge of the bead filler, a ratio of the rubber thickness Ga with respect to the rubber thickness Gb, and a ratio of the rubber thickness Gc with respect to the rubber thickness Ga were each varied as shown in Table 1.

Note that in each of the tires, rayon fiber cord was used for each of the carcass layers, steel cord was used for the belt layers, and the ratio of the tire cross-sectional height SHi on the inner side in the tire radial direction to the tire cross-sectional height SHo on the outer side in the tire radial direction for each tire was configured so as to be 0.85. Additionally, configurations of the side reinforcing layer, bead filler, and belt cover layer of each tire were as shown in Table 1.

These six types of tires were each mounted on the front and rear wheels of a front-engine front-wheel drive (FF) vehicle having an engine displacement of 1,800 cc. Run flat durability and riding comfort were evaluated via the test methods described below.

Run Flat Durability

Each tire was assembled on a rim (size: 17×8.0 J) and inflated to an air pressure of 260 kPa. The valve core of the right side drive axle tire (one of the four tires) was removed and the vehicle was run on an asphalt road surface test course at an average speed of 80 km/h. Running was continued until the driver felt vibration caused by the breakdown of the tire. Run flat durability was evaluated based on the average running distance. Three experienced test drivers performed this evaluation and the results were averaged and recorded in Table 1 as index values with the value of the conventional tire being 100. Larger index values indicate superior run flat durability.

Riding Comfort

Each tire was assembled on a rim (size: 17×8.0 J) and inflated to an air pressure of 230 kPa. The vehicle was run on a dry asphalt road surface test course at an average speed of 80 km/h and three experienced test drivers performed a sensory evaluation. The results of the evaluations were tallied on a 5-point scoring scale with the score of the conventional tire being 3, and the average score thereof was recorded in Table 1. Larger index values indicate superior riding comfort.

TABLE 1

|  |  | Conv. Example | W.E. 1 | W.E. 2 | W.E. 3 | W.E. 4 | W.E. 5 |
|---|---|---|---|---|---|---|---|
| Intersection P position |  | Shoulder side | Equator side | Equator side | Equator side | Equator side | Equator side |
| Angle α (°) |  | 6.5 | 9.0 | 9.0 | 9.0 | 9.0 | 9.0 |
| Carcass folded up end to bead core outer peripheral surface |  | 40 mm | 10 mm | 10 mm | 10 mm | 10 mm | 10 mm |
| Height Hf/SH of the outer peripheral edge of the bead filler |  | 0.5 | 0.5 | 0.5 | 0.5 | 0.5 | 0.5 |
| Ratio of rubber thickness Ga with respect to rubber thickness Gb |  | 0.5 Gb | 0.75 Gb | 0.75 Gb | 0.75 Gb | 0.75 Gb | 0.75 Gb |
| Ratio of rubber thickness Gc with respect to rubber thickness Ga |  | 0.5 Ga | 0.90 Ga | 0.90 Ga | 0.90 Ga | 0.90 Ga | 0.90 Ga |
| JIS-A rubber hardness of the side reinforcing layer | Inner side rubber | 72 | 72 | 75 | 75 | 75 | 75 |
|  | Outer side rubber | 72 | 72 | 65 | 65 | 65 | 65 |
| JIS-A rubber hardness of the bead filler | Inner side rubber | 80 | 80 | 80 | 80 | 85 | 85 |
|  | Outer side rubber | 80 | 80 | 80 | 80 | 75 | 75 |
| tanδ at 60° C. of the bead filler | Outer side rubber | 0.15 | 0.07 | 0.07 | 0.05 | 0.07 | 0.05 |
|  | Inner side rubber | 0.15 | 0.07 | 0.07 | 0.07 | 0.07 | 0.07 |
| Material of belt cover layers 8, 8 |  | Nylon fiber | Nylon fiber | Nylon fiber | Nylon fiber | Nylon fiber | Composite fiber |
| Evaluation Results | Run flat durability | 100 | 104 | 106 | 107 | 108 | 109 |
|  | Riding comfort | 3 | 3.7 | 4.0 | 4.0 | 4.7 | 4.7 |

Notes for Table 1:
In Table 1, "Conv. Example" is an abbreviation for "Conventional Example" and "W.E." is an abbreviation for "Working Example".

It is clear from Table 1 that, compared to the tire of the Conventional Example, the tires of the Working Examples of the present technology enhance run flat durability and riding comfort in a well-balanced manner.

What is claimed is:

1. A run flat tire comprising one layer of a carcass layer provided around bead cores embedded in a left-right pair of bead portions and folded over from a tire inner side toward a tire outer side, wherein a plurality of belt layers is disposed in an outer circumferential side in a tread portion, a belt cover layer formed from organic fiber cords is disposed on the outer circumferential side of the belt layers, and a side reinforcing layer having a falcated cross-section is disposed between the carcass layer and an inner liner layer in a side wall portion; wherein a relationship between a tire cross-sectional height SHi on an inner side in a tire radial direction and a tire cross-sectional height SHo on an outer side in the tire radial direction, demarcated by a maximum tire width position when the run flat tire is assembled on a JATMA regulation standard rim and inflated to an air pressure of 180 kPa, is 0.7<SHi/SHo<0.9; an intersection P of a line tangent to an intersection S of a straight line Q in a tire axial direction passing through a midpoint of the tire cross-sectional height SHo and a tire outer wall and an tire external diameter line Z is positioned more to a tire equatorial plane side than an endpoint of a region R that corresponds to 90% of a rim width HRW of the standard rim having the tire equatorial plane as a center; an angle α of a straight line connecting, in the tread surface, a point O on the tire equatorial plane and a point R' on a shoulder side corresponding to 110% of a tire ground contact width TW having the tire equatorial plane as a center, with respect to the tire axial direction, is from 7.5° to 10°;

a folded up end of the carcass layer is positioned in a region within 15 mm from an outer peripheral surface of the bead core toward the outer side in the tire radial direction and a height Hf of an outer peripheral edge of the bead filler is from 40% to 70% of a tire cross-section height SH;

when Ga is a rubber thickness, taken on a line normal to a rim line at an outer wall surface of the bead portion, between the carcass layer and an outer wall surface of the side wall portion; and Gb is a maximum rubber thickness taken on a line normal to the carcass layer between the carcass layer and the outer wall surface of the side wall portion, a relationship between Ga and Gb is 0.60Gb<Ga<0.85Gb; and when Gc is a rubber thickness taken on a line normal to the rim line between the carcass layer and a tire inner wall surface, a relationship between Gc and Ga is 0.75Ga<Gc<1.00Ga.

2. The run flat tire according to claim 1, wherein a relationship between the tire ground contact width TW and a tire maximum width SW is 0.65<TW/SW<0.75.

3. The run flat tire according to claim 1, wherein the side reinforcing layer is formed from an inner side rubber and an outer side rubber that are continuous in the tire radial direction, and a JIS-A hardness of the inner side rubber of the rubber forming the side reinforcing layer is greater than that of the outer side rubber.

4. The run flat tire according to claim 3, wherein a tan δ at 60° C. of the inner side rubber is greater than a tan δ at 60° C. of the outer side rubber.

5. The run flat tire according to claim 3, wherein a tan δ at 60° C. of the inner side rubber of the rubber forming the side reinforcing layer is greater than a tan δ at 60° C. of the outer side rubber, and the tan δ at 60° C. of the rubber forming the side reinforcing layer is in a range from 0.01 to 0.10.

6. The run flat tire according to claim 1, wherein the belt cover layer is composed of a composite fiber cord that is formed by twisting together a low elasticity yarn and a high elasticity yarn having differing elastic moduli.

7. The run flat tire according to claim 1, wherein the angle α of the straight line connecting, in the tread surface, the point O on the tire equatorial plane and the point R' on the shoulder side corresponding to 110% of the tire ground contact width TW having the tire equatorial plane as the center, with respect to the tire axial direction, is from 8.0° to 9.5°.

8. The run flat tire according to claim 1, wherein the relationship between Ga and Gb is 0.70Gb<Ga<0.80Gb.

9. The run flat tire according to claim 1, wherein the relationship between Gc and Ga is 0.85Ga<Gc<0.95Ga.

10. The run flat tire according to claim 1, wherein the side reinforcing layer is formed from an inner side rubber and an outer side rubber that are continuous in the tire radial direction; a JIS-A hardness of the inner side rubber of the rubber forming the side reinforcing layer is greater than that of the outer side rubber; and the JIS-A hardness of the rubber forming the side reinforcing layer is in a range from 60 to 80.

11. The run flat tire according to claim 1, wherein:
a relationship between the tire ground contact width TW and a tire maximum width SW is 0.65<TW/SW<0.75; and
the side reinforcing layer is formed from an inner side rubber and an outer side rubber that are continuous in the tire radial direction, and a JIS-A hardness of the inner side rubber of the rubber forming the side reinforcing layer is greater than that of the outer side rubber.

* * * * *